United States Patent
Ho et al.

(10) Patent No.: US 9,479,259 B2
(45) Date of Patent: *Oct. 25, 2016

(54) MULTI-CHANNEL OPTICAL TRANSCEIVER MODULE INCLUDING THERMAL ARRAYED WAVEGUIDE GRATING MULTIPLEXER AND ATHERMAL ARRAYED WAVEGUIDE GRATING DEMULTIPLEXER

(71) Applicant: Applied Optoelectronics, Inc., Sugar Land, TX (US)

(72) Inventors: I-Lung Ho, Sugar Land, TX (US); Stefan J. Murry, Houston, TX (US); Jun Zheng, Missouri City, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,011

(22) Filed: Oct. 30, 2014

(65) Prior Publication Data

US 2016/0127044 A1    May 5, 2016

(51) Int. Cl.
*H04B 10/40* (2013.01)
*H04J 14/02* (2006.01)
(Continued)

(52) U.S. Cl.
CPC ............ *H04B 10/40* (2013.01); *H04B 10/506* (2013.01); *H04J 14/02* (2013.01); *H04J 14/025* (2013.01);
(Continued)

(58) Field of Classification Search
CPC ............................... H04B 10/40; H04B 10/43
USPC .................................................. 398/135–139
See application file for complete search history.

(56) References Cited

U.S. PATENT DOCUMENTS 6,118,562 A * 9/2000 Lee ...................... H01S 5/0687
372/23
6,954,566 B2 * 10/2005 Johannessen ...... G02B 6/12014
385/37

(Continued)

FOREIGN PATENT DOCUMENTS

WO    2014123866 A1    8/2014

OTHER PUBLICATIONS

Saito, Tsunetoshi et al, "Temperature-Insensitive (Athermal) AWG Modules", Furukawa Review No. 24, 2003, pp. 29-33.
(Continued)

*Primary Examiner* — Li Liu
(74) *Attorney, Agent, or Firm* — Grossman Tucker Perreault & Pfleger, PLLC; Norman S. Kinsella

(57) ABSTRACT

A multi-channel optical transceiver includes a transmitter optical subassembly (TOSA) with a thermal arrayed waveguide grating (AWG) for multiplexing optical signals and a receiver optical subassembly (ROSA) with an athermal AWG for demultiplexing optical signals. The TOSA may also include a laser array optically coupled to the thermal AWG and a temperature control system thermally coupled to the laser array and the thermal AWG to control temperature for wavelength tuning. The temperature control system in the TOSA may include a thermoelectric cooler (TEC) that cools both the laser array and the thermal AWG. Because the athermal AWG in the ROSA is temperature independent, the ROSA does not include a TEC, thereby reducing power consumption and conserving space. The optical transceiver may be used in a wavelength division multiplexed (WDM) optical system, for example, in an optical line terminal (OLT) in a WDM passive optical network (PON).

17 Claims, 3 Drawing Sheets

(51) Int. Cl.
*H04B 10/50* (2013.01)
*G02B 6/42* (2006.01)
*G02B 6/12* (2006.01)

(52) U.S. Cl.
CPC ........ *H04J 14/0246* (2013.01); *H04J 14/0278* (2013.01); *G02B 6/12033* (2013.01); *G02B 6/4215* (2013.01)

(56) References Cited

U.S. PATENT DOCUMENTS

| | | | | |
|---|---|---|---|---|
| 7,325,983 | B1* | 2/2008 | Dallesasse | G02B 6/4201 385/1 |
| 7,359,641 | B2* | 4/2008 | Dallesasse | G02B 6/4201 398/135 |
| 8,335,432 | B1* | 12/2012 | Darcie | H04J 14/0257 398/58 |
| 8,831,433 | B2* | 9/2014 | Ho | H04B 10/40 398/138 |
| 8,995,484 | B2* | 3/2015 | Ho | H01S 3/04 372/34 |
| 9,039,303 | B2* | 5/2015 | Wang | H04B 10/40 385/147 |
| 2005/0152663 | A1* | 7/2005 | Bench | G02B 6/4246 385/147 |
| 2005/0286895 | A1* | 12/2005 | Lee | H04J 14/02 398/79 |
| 2006/0045412 | A1* | 3/2006 | Xiao | G01D 5/35383 385/14 |
| 2006/0104638 | A1* | 5/2006 | Chung | H04J 14/0226 398/71 |
| 2006/0165412 | A1* | 7/2006 | Jung | H04J 14/0226 398/71 |
| 2007/0212072 | A1* | 9/2007 | Iannone | H04J 14/0226 398/72 |
| 2007/0264021 | A1* | 11/2007 | Li | H04J 14/02 398/135 |
| 2008/0095541 | A1* | 4/2008 | Dallesasse | H04B 10/40 398/191 |
| 2008/0131122 | A1* | 6/2008 | Reisslein | H04J 14/0227 398/59 |
| 2010/0067854 | A1* | 3/2010 | Oki | H01R 13/748 385/92 |
| 2010/0129077 | A1* | 5/2010 | Bainbridge | H04J 14/0265 398/79 |
| 2010/0202781 | A1* | 8/2010 | Hudgins | H04B 10/40 398/135 |
| 2011/0229096 | A1* | 9/2011 | Oki | G02B 6/4201 385/92 |
| 2012/0087659 | A1 | 4/2012 | Gill | |
| 2012/0148254 | A1* | 6/2012 | Yamauchi | H04B 10/40 398/135 |
| 2012/0195553 | A1* | 8/2012 | Hasegawa | G02B 6/12014 385/37 |
| 2014/0161455 | A1 | 6/2014 | Ho et al. | |
| 2015/0104177 | A1* | 4/2015 | Kato | G02B 6/4201 398/79 |
| 2015/0253520 | A1* | 9/2015 | Huang | G02B 6/423 385/90 |
| 2015/0256259 | A1* | 9/2015 | Huang | G01J 1/0271 398/88 |

OTHER PUBLICATIONS

PCT International Search Report/Written Opinion mailed Jan. 21, 2016, received in corresponding PCT Application No. PCT/US15/58332, 8 pgs.

* cited by examiner

MULTI-CHANNEL OPTICAL TRANSCEIVER MODULE INCLUDING THERMAL ARRAYED WAVEGUIDE GRATING MULTIPLEXER AND ATHERMAL ARRAYED WAVEGUIDE GRATING DEMULTIPLEXER

TECHNICAL FIELD

The present disclosure relates to optical transceivers and more particularly, to a multi-channel optical transceiver module including a thermal arrayed waveguide grating (AWG) multiplexer and an athermal AWG demultiplexer.

BACKGROUND INFORMATION

Fiber optic communications networks may increase the amount of information carried on an optical fiber by multiplexing different optical signals on different wavelengths using wavelength division multiplexing (WDM). In a WDM passive optical network (PON), for example, a trunk fiber carries optical signals at multiple channel wavelengths to and from an optical branching point and the branching point provides a simple routing function by directing signals of different wavelengths to and from individual subscribers. In this case, each subscriber may be assigned one or more of the channel wavelengths on which to send and/or receive data.

To transmit and receive optical signals over multiple channel wavelengths, an optical line terminal (OLT) in a WDM-PON may include a multi-channel transmitter optical subassembly (TOSA), a multi-channel receiver optical subassembly (ROSA), and associated circuitry. One challenge with such OLT transceiver modules is providing temperature control in a relatively small space and with relatively low power consumption.

BRIEF DESCRIPTION OF THE DRAWINGS

These and other features and advantages will be better understood by reading the following detailed description, taken together with the drawings wherein.

DETAILED DESCRIPTION

A multi-channel optical transceiver, consistent with embodiments described herein, includes a transmitter optical subassembly (TOSA) with a thermal arrayed waveguide grating (AWG) for multiplexing optical signals and a receiver optical subassembly (ROSA) with an athermal AWG for demultiplexing optical signals. The TOSA may also include a laser array optically coupled to the thermal AWG and a temperature control system thermally coupled to the laser array and the thermal AWG to control temperature for wavelength tuning. The temperature control system in the TOSA may include a thermoelectric cooler (TEC) that cools both the laser array and the thermal AWG. Because the athermal AWG in the ROSA is temperature independent, the ROSA does not include a TEC, thereby reducing power consumption and conserving space. The optical transceiver may be used in a wavelength division multiplexed (WDM) optical system, for example, in an optical line terminal (OLT) in a WDM passive optical network (PON).

As used herein, "thermal AWG" refers to an AWG that is temperature dependent in that at least one of the wavelengths passed by the AWG changes in response to temperature changes across the operating temperature (i.e., between −5 and 75° C.) of the optical transceiver and an "athermal AWG" refers to an AWG that is temperature independent in that the wavelengths passed by the AWG do not change significantly in response to temperature changes across the operating temperature (i.e., between −5 and 75° C.) of the optical transceiver. As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. As used herein, "tuning to a channel wavelength" refers to adjusting a laser output such that the emitted laser light includes the channel wavelength.

The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. As used herein, "thermally coupled" refers to a direct or indirect connection or contact between two components resulting in heat being conducted from one component to the other component.

Figure 1:
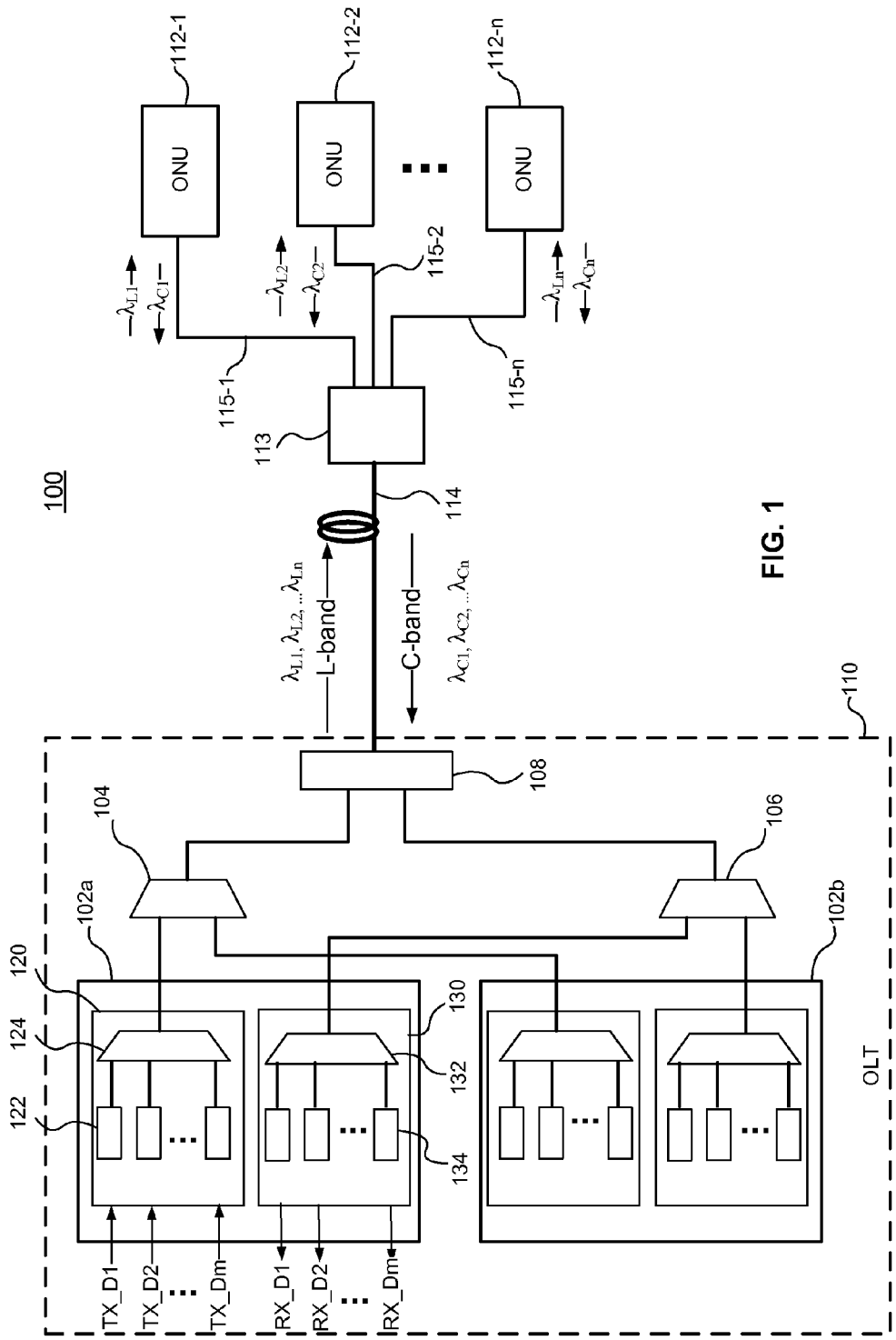
FIG. 1 is a functional block diagram of a wavelength division multiplexed (WDM) passive optical network (PON) including at least one multi-channel optical transceiver with a thermal AWG and an athermal AWG, consistent with embodiments of the present disclosure.

Referring to FIG. 1, a WDM-PON 100 may include one or more multi-channel optical transceivers 102a, 102b with a thermal AWG for multiplexing and an athermal AWG for demultiplexing, consistent with embodiments of the present disclosure. The WDM-PON 100 provides a point-to-multi-point optical network architecture using a WDM system. According to one embodiment of the WDM-PON 100, at least one optical line terminal (OLT) 110 may be coupled to a plurality of optical networking terminals (ONTs) or optical networking units (ONUs) 112-1 to 112-n via optical fibers, waveguides, and/or paths 114, 115-1 to 115-n. Although the OLT 110 includes two multi-channel optical transceivers 102a, 102b in the illustrated embodiment, the OLT 110 may include one or more multi-channel optical transceivers.

The OLT 110 may be located at a central office of the WDM-PON 100, and the ONUs 112-1 to 112-n may be located in homes, businesses or other types of subscriber location or premises. A branching point 113 (e.g., a remote node) couples a trunk optical path 114 to the separate optical paths 115-1 to 115-n to the ONUs 112-1 to 112-n at the respective subscriber locations. The branching point 113 may include one or more passive coupling devices such as a splitter or optical multiplexer/demultiplexer. In one example, the ONUs 112-1 to 112-n may be located about 20 km or less from the OLT 110.

The WDM-PON 100 may also include additional nodes or network devices, such as Ethernet PON (EPON) or Gigabit PON (GPON) nodes or devices, coupled between the branching point 113 and ONUs 112-1 to 112-n at different locations or premises. One application of the WDM-PON 100 is to provide fiber-to-the-home (FTTH) or fiber-to-the-premises (FTTP) capable of delivering voice, data, and/or video services across a common platform. In this application, the central office may be coupled to one or more sources or networks providing the voice, data and/or video.

In the WDM-PON 100, different ONUs 112-1 to 112-n may be assigned different channel wavelengths for transmitting and receiving optical signals. In one embodiment, the WDM-PON 100 may use different wavelength bands for transmission of downstream and upstream optical signals relative to the OLT 110 to avoid interference between the received signal and back reflected transmission signal on the same fiber. For example, the L-band (e.g., about 1565 to 1625 nm) may be used for downstream transmissions from the OLT 110 and the C-band (e.g., about 1530 to 1565 nm) may be used for upstream transmissions to the OLT 110. The upstream and/or downstream channel wavelengths may generally correspond to the ITU grid. In one example, the upstream wavelengths may be aligned with the 100 GHz ITU grid and the downstream wavelengths may be slightly offset from the 100 GHz ITU grid.

The ONUs 112-1 to 112-n may thus be assigned different channel wavelengths within the L-band and within the C-band. Transceivers or receivers located within the ONUs 112-1 to 112-n may be configured to receive an optical signal on at least one channel wavelength in the L-band (e.g., $\lambda_{L1}$, $\lambda_{L2}$, ... $\lambda_{Ln}$). Transceivers or transmitters located within the ONUs 112-1 to 112-n may be configured to transmit an optical signal on at least one channel wavelength in the C-band (e.g., $\lambda_{C1}$, $\lambda_{C2}$, ..., $\lambda_{Cn}$). Other wavelengths and wavelength bands are also within the scope of the system and method described herein.

The branching point 113 may demultiplex a downstream WDM optical signal (e.g., $\lambda_{L1}$, $\lambda_{L2}$, ..., $\lambda_{Ln}$) from the OLT 110 for transmission of the separate channel wavelengths to the respective ONUs 112-1 to 112-n. Alternatively, the branching point 113 may provide the downstream WDM optical signal to each of the ONUs 112-1 to 112-n and each of the ONUs 112-1 to 112-n separates and processes the assigned optical channel wavelength. The individual optical signals may be encrypted to prevent eavesdropping on optical channels not assigned to a particular ONU. The branching point 113 also combines or multiplexes the upstream optical signals from the respective ONUs 112-1 to 112-n for transmission as an upstream WDM optical signal (e.g., $\lambda_{C1}$, $\lambda_{C2}$, ... $\lambda_{Cn}$) over the trunk optical path 114 to the OLT 110.

The OLT 110 may be configured to generate multiple optical signals at different channel wavelengths (e.g., $\lambda_{L1}$, $\lambda_{L2}$, ... $\lambda_{Ln}$) and to combine the optical signals into the downstream WDM optical signal carried on the trunk optical fiber or path 114. Each of the OLT multi-channel optical transceivers 102a, 102b may include a multi-channel transmitter optical subassembly (TOSA) 120 for generating and combining the optical signals at the multiple channel wavelengths. The OLT 110 may also be configured to separate optical signals at different channel wavelengths (e.g. $\lambda_{C1}$, $\lambda_{C2}$, ... $\lambda_{Cn}$) from an upstream WDM optical signal carried on the trunk path 114 and to receive the separated optical signals. Each of the OLT multi-channel optical transceivers 102a, 102b may thus include a multi-channel receiver optical subassembly (ROSA) 130 for separating and receiving the optical signals at multiple channel wavelengths.

One embodiment of the multi-channel TOSA 120 includes a laser array 122, such as an array of laser diodes, which may be modulated by respective RF data signals (TX_D1 to TX_Dm) to generate the respective optical signals. The laser array 122 may be modulated using various modulation techniques including external modulation and direct modulation. A thermal AWG 124 multiplexes or combines the optical signals at the different respective downstream channel wavelengths (e.g., $\lambda_{L1}$, $\lambda_{L2}$, ... $\lambda_{Lm}$). The TOSA 120 may also include a temperature control system for controlling temperature of the laser array 122 and the thermal AWG 124, for example, to maintain a desired wavelength precision or accuracy.

The laser array 122 may include an array of laser emitters such as laser diode chips or gain chips forming external cavity lasers. In some embodiments, the laser array 122 may include tunable lasers that generate the optical signals at the respective channel wavelengths. In other embodiments, the laser array 122 may include lasers that generate optical signals over a band of channel wavelengths and filtering and/or multiplexing techniques may be used to produce the assigned channel wavelengths. Examples of optical transmitters including a laser array and AWG are disclosed in greater detail in U.S. patent application Ser. No. 13/543,310 (U.S. Patent Application Pub. No. 2013-0016971), U.S. patent application Ser. No. 13/357,130 (U.S. Patent Application Pub. No. 2013-0016977), and U.S. patent application Ser. No. 13/595,505 (U.S. Patent Application Pub. No. 2013-0223844), all of which are fully incorporated herein by reference. In the illustrated embodiment, the OLT 110 further includes an optical multiplexer 104 for multiplexing the multiplexed optical signal from the multi-channel TOSA 120 in the multi-channel transceiver 102a with a multiplexed optical signal from a multi-channel TOSA in the other multi-channel transceiver 102b to produce the downstream aggregate WDM optical signal.

One embodiment of the multi-channel ROSA 130 includes an athermal AWG 132 for demultiplexing or separating the respective upstream channel wavelengths (e.g., $\lambda_{C1}$, $\lambda_{C2}$, ... $\lambda_{Cn}$). An array of photodetectors 134, such as photodiodes, detects the optical signals at the respective separated upstream channel wavelengths and provides the received data signals (RX_D1 to RX_Dm). In the illustrated embodiment, the OLT 110 further includes an optical demultiplexer 106 for demultiplexing the upstream WDM optical signal into first and second WDM optical signals provided to the respective multi-channel ROSA in each of the transceivers 102a, 102b. The OLT 110 also includes a diplexer 108 between the trunk path 114 and the multiplexer 104 and the demultiplexer 106 such that the trunk path 114 carries both the upstream and the downstream channel wavelengths. The transceivers 102a, 102b may also include other components, such as laser drivers, transimpedance amplifiers (TIAs), and control interfaces, used for transmitting and receiving optical signals.

In one example, each of the multi-channel optical transceivers 102a, 102b may be configured to transmit and receive 16 channels such that the WDM-PON 100 supports 32 downstream L-band channel wavelengths and 32 upstream C-band channel wavelengths. As mentioned above, the upstream and downstream channel wavelengths may span a range of channel wavelengths on the 100 GHz ITU grid. Each of the transceivers 102a, 102b, for example, may cover 16 channel wavelengths in the L-band for the TOSA and 16 channel wavelengths in the C-band for the ROSA such that the transceivers 102a, 102b together cover 32 channels. Thus, the multiplexer 104 may combine 16 channels from one transceiver 102a with 16 channels from the other transceiver 102b, and the demultiplexer 106 may separate a 32 channel WDM optical signal into two 16 channel WDM optical signals. According to one example of a multi-channel optical transceiver used in the WDM-PON 100, the desired wavelength precision or accuracy is ±0.05 nm, the desired operating temperature is between −5 and 70° C., and the desired power dissipation is about 16.0 W.

Figure 2:
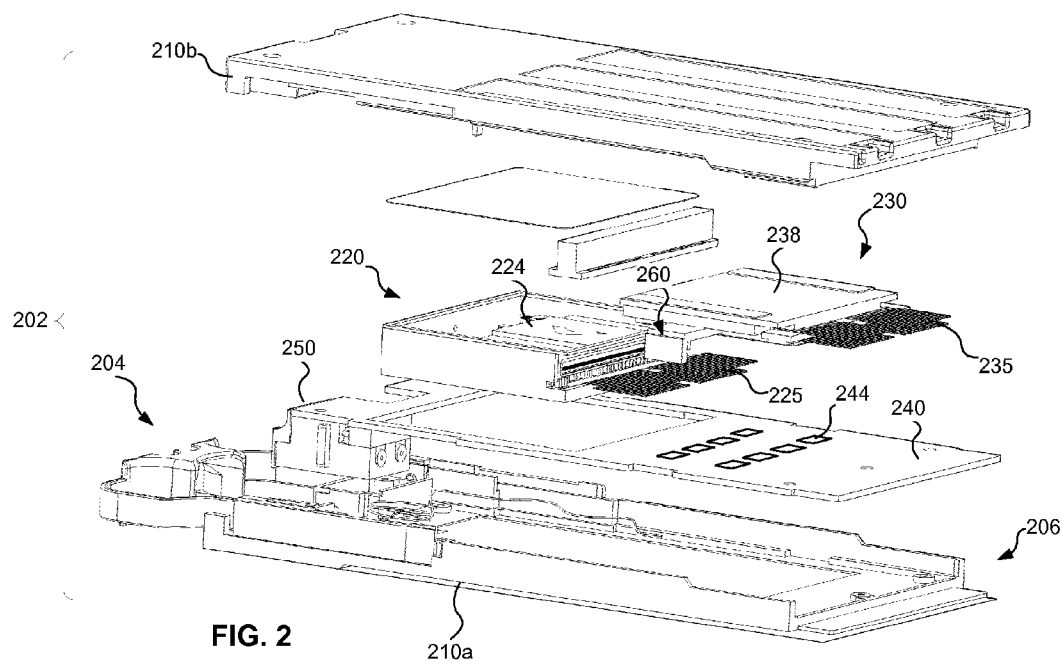
FIG. 2 is an exploded view of a compact multi-channel optical transceiver including a multi-channel TOSA with a thermal AWG and a ROSA with an athermal AWG, consistent with an embodiment of the present disclosure.
Figure 3:
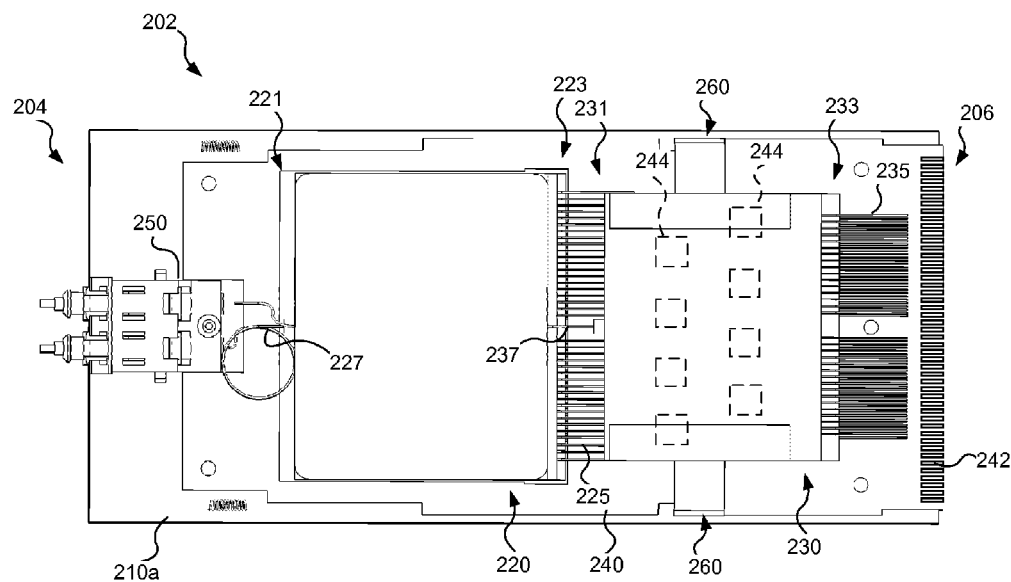
FIG. 3 is a top view inside the multi-channel optical transceiver shown in FIG. 2.

Referring to FIGS. 2 and 3, one embodiment of a multi-channel optical transceiver module 202 is shown and described in greater detail. As discussed above, multiple multi-channel transceiver modules may be used in an OLT of a WDM-PON to cover a desired channel range. The transceiver module 202 may thus be designed to have a relatively small form factor with minimal space. The optical transceiver module 202 generally provides an optical input and output at an optical connection end 204 and electrical input and output at an electrical connection end 206. The transceiver module 202 includes a transceiver housing 210a, 210b enclosing a multi-channel TOSA 220, a multi-channel ROSA 230, a circuit board 240, and a dual fiber adapter 250 directly linked to the TOSA 220 and the ROSA 230 for providing the optical input and output. The transceiver housing 210a, 210b may have a width of less than about 55 mm, a length of less than about 130 mm, and a height of less than about 10 mm. More specifically, one example of a transceiver housing 210 may have a width of 54.6 mm, a length of 110 mm, and a height of about 9.8 mm.

In the example embodiment, the TOSA 220 is located in the transceiver housing 210a, 210b proximate the optical connection end 204 and the ROSA 230 is located in the transceiver housing 210a, 210b proximate the electrical connection end 206. The circuit board 240 is located proximate the transceiver housing bottom portion 210a and extends to the electrical connection end 206. The ROSA 230 is located between the circuit board 240 and the transceiver housing top portion 210b. As will be described in greater detail below, the ROSA 230 may be spaced from the circuit board 240 to provide space for circuit board components and may be inverted and positioned proximate the transceiver housing top portion 210b to facilitate heat transfer from the ROSA 230 to the housing top portion 210b.

The TOSA 220 and the ROSA 230 each have an optical connection end 221, 231 directed toward the transceiver optical connection end 204 and an electrical connection end 223, 233 directed toward the transceiver electrical connection end 206. The optical connection ends 221, 231 of the TOSA 220 and the ROSA 230 are optically coupled to the dual fiber adapter 250 with respective optical fibers 227, 237, respectively, to provide a direct link between the adapter 250 and both the TOSA 220 and the ROSA 230. The electrical connection ends 223, 233 of the TOSA 220 and the ROSA 230 are electrically connected to the circuit board 240 using TOSA pins 225 and ROSA pins 235, respectively, soldered to conductive pads on the circuit board 240. The circuit board 240 includes input/output conductive pads 242 proximate the transceiver electrical connection end 206. Input conductive pads 242 may be provided on one side of the circuit board 240 for providing RF input to the TOSA 220 and output conductive pads 242 may be provided on the other side of the circuit board 240 for providing output from the ROSA 230.

The dual fiber adapter 250 is also configured to receive pluggable optical connectors, such as LC connectors (not shown), to connect the TOSA 220 and ROSA 230, respectively, to fiber optic cables (not shown). When the pluggable optical connectors are plugged into the dual fiber adapter 250, the adapter 250 establishes an optical coupling between the TOSA 220 and the ROSA 230 and the respective optical fibers in the fiber-optic cables, which carry the optical signals to and from the transceiver.

The multi-channel TOSA 220 includes a thermal AWG 224 coupled to a laser array (not shown in FIGS. 2 and 3). A temperature control system, as will be described in greater detail below, may be used to control the temperature of both the thermal AWG 224 and the laser array. The temperature may be controlled, for example, to provide a desired wavelength with a desired wavelength precision or accuracy. In one example, the temperature of each laser is maintained within ±0.5° C. in the operating range between −5 and 70° C. to maintain a wavelength precision or accuracy of about ±0.05 nm.

Although the illustrated embodiment shows the TOSA 220 with the bottom region facing the transceiver housing bottom portion 210a, the TOSA 220 may also be inverted and the bottom of the TOSA 220 may be thermally coupled to (e.g., touching) the transceiver housing top portion 210b. The transceiver module 202 may be mounted in a cage assembly with the transceiver housing top portion 210b being located proximate a heat sink at the top of the cage. Because the TOSA 220 generates most of the heat from the bottom portion (e.g., from the TEC), the upside down or inverted configuration may provide better thermal dissipation and improve the overall working temperature range of the transceiver module 202.

The multi-channel ROSA 230 includes an athermal AWG coupled to an array of photodetectors, such as photodiodes, as will be described in greater detail below. The printed circuit board 240 may include circuitry and electronic components such as laser diode drivers, transimpedance amplifiers (TIAs), control interfaces, and temperature control circuitry. In the example embodiment, the circuit board 240 includes integrated circuit (IC) components 244 electrically connected to the TOSA 220 and the ROSA 230, for example, using conductive traces on or in the circuit board 240. The IC components 244 are mounted on at least one side of the circuit board 240 between the circuit board 240 and the ROSA 230 and may also be mounted on the opposite side of the circuit board 240. The IC components 244 may be arranged on the circuit board 240 in one or more rows of IC components 244. In one embodiment, the IC components are combination IC components including a laser diode driver and a photodiode limiting amplifier.

In the example embodiment, ROSA supports 260 hold and support the ROSA 230 on each side of the ROSA 230. The ROSA supports 260 are mounted to the transceiver housing bottom portion 210a such that the ROSA 230 is spaced from the circuit board 240. The illustrated embodiment of the ROSA supports 260 have an L-shaped portion such that the ROSA supports 260 extend from sides of the transceiver housing bottom portion 210a and support the ROSA 230 without interfering with the circuit board 240 or any components thereon. The L-shaped portions support the ROSA 230 and space the ROSA 230 from the circuit board 240 with a space sufficient to receive circuit components, such as IC components 244. In one example, the space may be in a range of about 1.4 mm to 1.6 mm.

Figure 4:
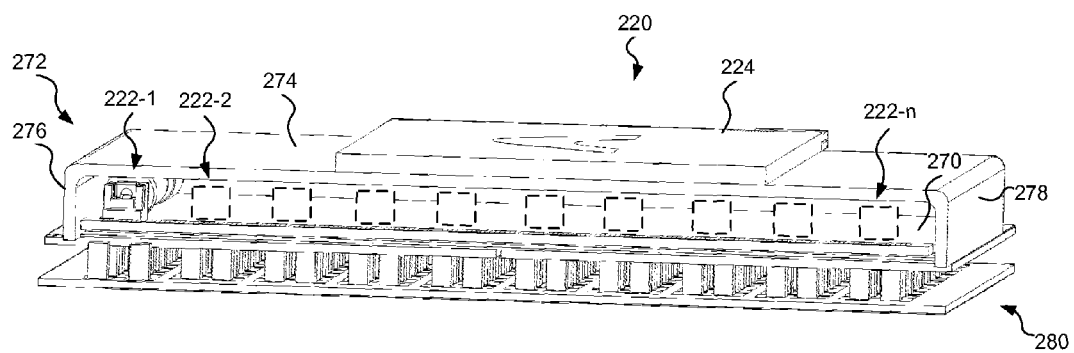
FIG. 4 is an end perspective view of one embodiment of the TOSA with the thermal AWG.

Referring to FIG. 4, an embodiment of the multi-channel TOSA 220 is described in greater detail. This embodiment of the multi-channel TOSA 220 includes an array of lasers 222-1 to 222-n (only laser 222-1 is shown in detail) optically coupled to the thermal AWG 224. The lasers 222-1 to 222-n may be optically coupled to the thermal AWG 224, for example, using low bending loss optical fibers (not shown). Each laser 222-1 may be provided as a laser package including, but not limited to, a laser diode chip mounted on a laser mounting structure. The laser package may also include optical components, such as a lens for optically coupling the laser light into a respective one of the optical fibers, and/or optoelectronic components, such as a monitor photodiode. The thermal AWG 224 may include an AWG chip such as the type used for WDM, Coarse WDM (CWDM), or Dense (DWDM) multiplexing or demultiplexing. The thermal AWG 224 in the TOSA 220 is temperature controlled, as described in greater detail below, to prevent temperature changes that may affect operation of the thermal AWG 224.

The array of lasers 222-1 to 222-n are supported on a laser array tray 270 and the thermal AWG is supported on an AWG tray 272. Both the laser array tray 270 and the AWG tray 272 are thermally coupled to the same temperature control device 280 such that the temperature control device 280, the laser array tray 270 and the AWG tray 272 provide a temperature control system for the TOSA within a relatively small space. The temperature control device 280 may be a thermoelectric cooler, such as a Peltier device, for cooling the array of lasers 222-1 to 222-n and the thermal AWG 224. In this embodiment, the AWG tray 272 supports the thermal AWG 224 above the lasers 222-1 to 222-n. By using the same temperature control device and supporting the thermal AWG 224 above the lasers 222-1 to 222-n, the desired temperature range can be maintained with relatively low power consumption and within a relatively small space.

In the illustrated embodiment, the AWG tray 272 includes a supporting portion 274 that supports the thermal AWG 224 and side portions 276, 278 that hold the supporting portion 274 above the lasers 222-1 to 222-n. The laser array tray 270 may be a relatively flat plate that fits between the side portions 276, 278 such that both the laser array tray 270 and the side portions 276, 278 of the AWG tray 272 are separately thermally coupled to the temperature control device 280 (e.g., to the cold side of a TEC). The laser array tray 270 and the side portions 276, 278 of the AWG tray 272 may each directly contact the temperature control device 280 or may be thermally coupled through another thermally conductive material. Because a larger surface area of the laser array tray 270 is thermally coupled to the temperature control device 280, the temperature of the lasers 222-1 to 222-n may be controlled more precisely. Although the illustrated embodiment shows a particular shape for the trays 270, 272, other shapes may also be used to support the lasers 222-1 to 222-n and the thermal AWG 224 and to provide thermal coupling to the same temperature control device 280. Each of the trays 270, 272 may also be formed as one piece or multiple pieces.

Both of the trays 270, 272 may be made of a thermally conductive material having a thermal conductivity greater than 60 W/(m·K) and more specifically greater than 80 W/(m·K). The trays 270, 272 may be made, for example of copper or zinc. At least a portion of the trays 270, 272 may also be gold plated, for example, to facilitate soldering to the trays 270, 272. In one example, the laser array tray 270 is made of AlN with a thermal conductivity of about 170 W/(m·K) and the AWG tray 272 is made of copper with Au plating and having a thermal conductivity of greater than 300 W/(m·K).

Figure 5:
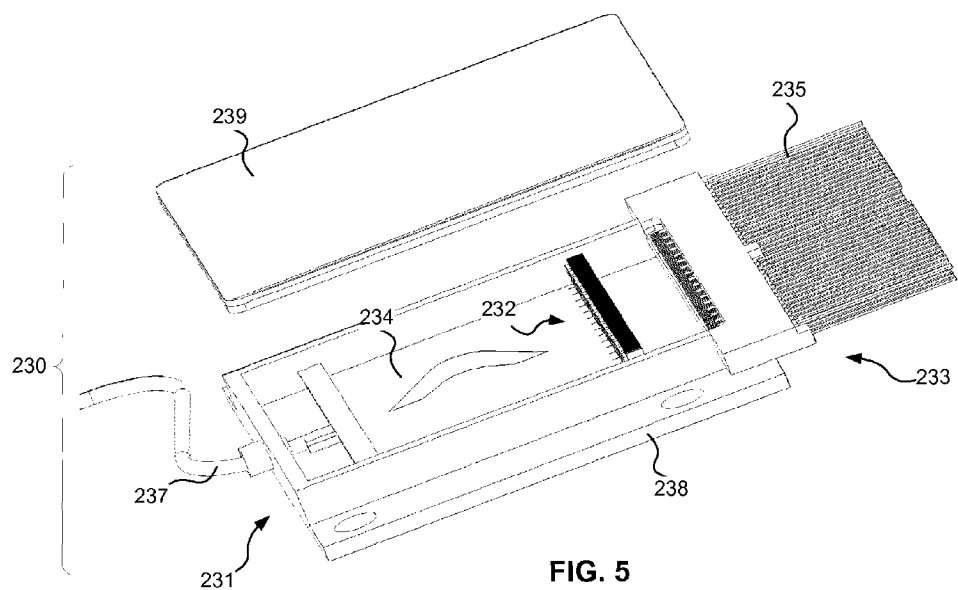
FIG. 5 is an exploded perspective view of one embodiment of the ROSA with the athermal AWG.

Referring to FIG. 5, an embodiment of the multi-channel ROSA 230 is described in greater detail. The ROSA 230 includes an athermal AWG 234 mounted on a ROSA base portion 238. Optical outputs of the athermal AWG 234 are optically coupled to an array of photodetectors 232, such as photodiodes. An input of the athermal AWG 234 is optically coupled to the input optical fiber 237 at the optical connection end 231 and the output of the photodetectors 232 are electrically connected to the ROSA pins 235 at the electrical connection end 233. A ROSA cover 239 covers the ROSA base portion 238 and encloses the athermal AWG 234 and array of photodetectors 232.

The athermal AWG 234 may include an AWG chip, such as the type used for WDM, Coarse WDM (CWDM), or Dense (DWDM) multiplexing or demultiplexing, which is also designed to be insensitive to temperature changes. One example of an athermal AWG is a 16 Channel DEMUX athermal AWG that is insensitive to temperature changes within a range of −5 to 75° C., such as the type currently available and/or known to those of ordinary skill in the art. Because temperature changes do not significantly impact the operation of the athermal AWG 234 or the photodetectors 232, the ROSA 230 does not include a TEC.

When the ROSA 230 is mounted relative to the circuit board 240, as shown in FIGS. 2 and 3 and described above, the ROSA 230 is inverted such that the ROSA base portion 238 faces away from the circuit board 240 and the ROSA supports 260 engage each side of the ROSA base portion 238. The ROSA supports 260 include, for example, clamping bars engaging the ROSA base portion 238 at each side and L-shaped portions extending from the respective clamping bars. Because the athermal AWG 234 and photodetectors 232 are mounted on or proximate the base portion 238, the heat generated by the ROSA 230 tends to be concentrated at the ROSA base portion 238. By inverting the ROSA 230, the ROSA base portion 238 is proximate and facing the transceiver housing top portion 210b (see FIG. 2) such that heat generated by the ROSA 230 is transferred to the transceiver housing top portion 210b and dissipated. The ROSA base portion 238 may be spaced from or thermally coupled to the housing top portion 210b (e.g., contacting the transceiver housing top portion 210b to conduct heat).

Accordingly, the multi-channel optical transceiver module, consistent with embodiments described herein, reduces power consumption and conserves space by using a thermal AWG for multiplexing in the TOSA and an athermal AWG for demultiplexing in the ROSA.

Consistent with an embodiment, a multi-channel optical transceiver module includes a transceiver housing, a multi-channel transmitter optical subassembly (TOSA) located in the transceiver housing, and a multi-channel receiver optical subassembly (ROSA) located in the transceiver housing. The TOSA is configured to transmit a wavelength division multiplexed (WDM) optical signal on multiple channel wavelengths and includes a thermal arrayed waveguide grating (AWG) for optical multiplexing. The ROSA is configured to receive a wavelength division multiplexed (WDM) optical signal on multiple channel wavelengths and includes an athermal AWG for optical demultiplexing.

Consistent with another embodiment, an optical line terminal includes at least first and second multi-channel transceivers. Each of the multi-channel transceivers include a transceiver housing, a multi-channel transmitter optical subassembly (TOSA) located in the transceiver housing, and a multi-channel receiver optical subassembly (ROSA) located in the transceiver housing. The TOSA is configured to transmit a wavelength division multiplexed (WDM) optical signal on multiple channel wavelengths and includes a thermal arrayed waveguide grating (AWG) for optical multiplexing. The ROSA is configured to receive a wavelength division multiplexed (WDM) optical signal on multiple channel wavelengths and includes an athermal AWG for optical demultiplexing.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A multi-channel optical transceiver module comprising:
    a transceiver housing;
    a multi-channel transmitter optical subassembly (TOSA) located in the transceiver housing, the TOSA being configured to transmit a wavelength division multiplexed (WDM) optical signal on multiple channel wavelengths, wherein the TOSA includes a thermal arrayed waveguide grating (AWG) for optical multiplexing; and
    a multi-channel receiver optical subassembly (ROSA) located in the transceiver housing, the ROSA being configured to receive a wavelength division multiplexed (WDM) optical signal on multiple channel wavelengths, wherein the ROSA includes an athermal AWG for optical demultiplexing;
    wherein the TOSA further includes:
    a laser array configured to generate laser light associated with different respective optical channels, wherein the thermal AWG is optically coupled to the laser array and configured to combine the laser light at different respective channel wavelengths; and
    a temperature control system configured to control temperature of both the laser array and the thermal AWG with a same temperature control device.

2. The multi-channel optical transceiver module of claim 1 wherein the TOSA further includes a temperature control system for controlling a temperature of the thermal AWG.

3. The multi-channel optical transceiver module of claim 1 wherein the TOSA further includes a thermoelectric cooler (TEC) thermally coupled to the thermal AWG.

4. The multi-channel transceiver module of claim 1 further comprising an AWG tray supporting the AWG above the laser array and thermally coupled to the temperature control device.

5. The multi-channel transceiver module of claim 1 wherein the temperature control system comprises a thermoelectric cooler as the same temperature control device.

6. The multi-channel transceiver module of claim 1 wherein the AWG tray is made of a material having a thermal conductivity greater than 60 W/(m-K).

7. The multi-channel optical transceiver module of claim 1 further comprising a circuit board located in the transceiver housing and electrically connected to the TOSA and to the ROSA.

8. The multi-channel optical transceiver module of claim 7 wherein the ROSA includes an array of photodetectors coupled to outputs of the athermal AWG.

9. The multi-channel optical transceiver module of claim 8 wherein the ROSA further includes a ROSA base portion, wherein the athermal AWG is mounted on the ROSA base portion, and wherein the ROSA is oriented in the transceiver housing with the ROSA base portion facing away from the circuit board and facing a top portion of the transceiver housing.

10. The multi-channel optical transceiver module of claim 9 further comprising ROSA supports mounted to a transceiver housing bottom portion and supporting the ROSA spaced from the circuit board.

11. The multi-channel optical transceiver module of claim 1 wherein the ROSA does not include a thermoelectric cooler.

12. The multi-channel optical transceiver module of claim 1 wherein a length of the transceiver housing is less than 130 mm, and a width of the transceiver housing is less than 55 mm.

13. An optical line terminal comprising:
    at least first and second multi-channel transceivers, each of the multi-channel transceivers comprising:
    a transceiver housing;
    a multi-channel transmitter optical subassembly (TOSA) located in the transceiver housing, the TOSA being configured to transmit a wavelength division multiplexed (WDM) optical signal on multiple channel wavelengths, wherein the TOSA includes a thermal arrayed waveguide grating (AWG) for optical multiplexing; and
    a multi-channel receiver optical subassembly (ROSA) located in the transceiver housing, the ROSA being configured to receive a wavelength division multiplexed (WDM) optical signal on multiple channel wavelengths, wherein the ROSA includes an athermal AWG for optical demultiplexing;
    wherein the TOSA further includes:
    a laser array configured to generate laser light associated with different respective optical channels, wherein the thermal AWG is optically coupled to the laser array and configured to combine the laser light at different respective channel wavelengths; and
    a temperature control system configured to control temperature of both the laser array and the thermal AWG with a same temperature control device.

14. The optical line terminal of claim 13 wherein the TOSA further includes a thermoelectric cooler (TEC) thermally coupled to the thermal AWG.

15. The optical line terminal of claim 13 further comprising an AWG tray supporting the AWG above the laser array and thermally coupled to the temperature control.

16. The optical line terminal of claim 13 wherein the temperature control system comprises a thermoelectric cooler as the same temperature control device.

17. The optical line terminal of claim 13 wherein the ROSA does not include a thermoelectric cooler.

* * * * *